(12) United States Patent
Iwata et al.

(10) Patent No.: US 6,168,888 B1
(45) Date of Patent: Jan. 2, 2001

(54) SPINEL-TYPE LITHIUM-MANGANESE OXIDE CONTAINING HETEROELEMENTS, PREPARATION PROCESS AND USE THEREOF

(75) Inventors: Eiichi Iwata; Ken-ichi Takahashi; Takashi Mōri, all of Yamaguchi-ken (JP)

(73) Assignee: Tosoh Corporation, Shinnanyo (JP)

(*) Notice: Under 35 U.S.C. 154(b), the term of this patent shall be extended for 0 days.

(21) Appl. No.: 09/099,131

(22) Filed: Jun. 18, 1998

(30) Foreign Application Priority Data

Jun. 19, 1997 (JP) .................................................. 9-162131

(51) Int. Cl.$^7$ .......................... H01M 4/50; H01M 4/88; C01G 45/12
(52) U.S. Cl. ................ 429/231.95; 429/224; 429/231.1; 423/599; 252/182.1; 252/519.15
(58) Field of Search ................. 429/224, 231.1, 429/231.95, 221, 231.5; 423/594, 596, 599; 252/182.1, 519.1, 519.15

(56) References Cited

U.S. PATENT DOCUMENTS

| | | |
|---|---|---|
| Re. 31,286 * | 6/1983 | Everett . |
| 4,956,248 | 9/1990 | Furukawa et al. . |
| 5,084,366 | 1/1992 | Toyoguchi . |
| 5,631,104 * | 5/1997 | Zhong et al. .................... 429/224 X |
| 5,672,329 | 9/1997 | Okada et al. . |
| 5,700,597 * | 12/1997 | Zhong et al. .................... 429/224 X |
| 5,869,208 * | 2/1999 | Miyasaka ............................ 429/224 |
| 5,900,385 * | 5/1999 | Dahn et al. ........................... 502/302 |
| 5,962,166 * | 10/1999 | Ein-Eli et al. . |
| 6,040,089 * | 3/2000 | Manev et al. . |

FOREIGN PATENT DOCUMENTS

| | | |
|---|---|---|
| 0 390 185 | 10/1990 | (EP) . |
| 0 717 455 | 6/1996 | (EP) . |
| 0 744 381 | 11/1996 | (EP) . |
| 0 814 524 | 12/1997 | (EP) . |
| 2 733 632 | 10/1996 | (FR) . |
| 2-60056 | 2/1990 | (JP) . |
| 2-139861 | 5/1990 | (JP) . |
| 2-199770 | 8/1990 | (JP) . |
| 3-219571 | 9/1991 | (JP) . |

OTHER PUBLICATIONS

G. Pistoia, et al., Chem. Mater., vol. 9, pp. 1443 to 1450, "Doped Li–Mn Spinels: Physical/Chemical Characteristics and Electrochemical Performance in Li Batteries", Jun. 16, 1997.

* cited by examiner

Primary Examiner—Stephen Kalafut
Assistant Examiner—Susy Tsang
(74) Attorney, Agent, or Firm—Oblon, Spivak, McClelland, Maier & Neustadt, P.C.

(57) ABSTRACT

A high-performance spinel-type lithium-manganese oxide for use as a material for a positive electrode of a Li secondary battery with inhibited Mn dissolution in an organic electrolyte, which is represented by the following formula:

$$\{Li\}[Li_x.M_y.Mn_{(2-x-y)}]O_{4+d}$$

wherein { } represents the oxygen tetrahedral sites in the spinel structure and [ ] represents the oxygen octahedral sites in the spinel structure, $0<x\leq0.33$, $0<y\leq1.0$, $-0.5<d<0.8$, and M represents at least one heteroelement other than Li and Mn, is disclosed.

19 Claims, 2 Drawing Sheets

SPINEL-TYPE LITHIUM-MANGANESE OXIDE CONTAINING HETEROELEMENTS, PREPARATION PROCESS AND USE THEREOF

BACKGROUND OF THE INVENTION

The present invention relates to a spinel-type lithium-manganese oxide containing at least one heteroelement (M) other than Li and Mn, as well as a preparation process and the use thereof.

Manganese oxides have been used for many years as an active material in electric cells. In recent years, lithium-manganese oxides which are composite materials of manganese and lithium as well as lithium-manganese oxides in which manganese in said lithium-manganese oxides is partially replaced by at least one heteroelement have attracted attention for use as an active material for positive electrodes of lithium secondary batteries which are capable of providing high output and high energy density.

Composite oxides of Li and various metals such as Co, Ni, Mn have been proposed as a material for positive electrode of lithium secondary batteries, which are required to have a high voltage working range, a high discharge capacity and a high cycle stability of charge and discharge.

A spinel-type $LiMn_2O_4$, which is one type of a composite oxide of Li and Mn, has been known to show a two-stage discharge, the first discharge stage being at a level of near 4V and the second discharge stage being at a level of near 3V. It seems to be promising as an active material for a positive electrode because it would be expected to provide high energy output if it could be reversibly cycled in a working range around 4V.

However, it has recently been found that Mn in the $LiMn_2O_4$ structure dissolves in organic electrolytes when charge and discharge is conducted using $LiMn_2O_4$ as an active material for lithium secondary batteries. Furthermore, our experiments revealed that as much as 1 mol % of the Mn content in the structure may dissolve when $LiMn_2O_4$ is merely stored at 85° C. in some organic electrolytes without performing charge and discharge, and that characteristics as an active material for a positive electrode significantly deteriorate after dissolution.

This means that Mn in the $LiMn_2O_4$ structure used as a positive electrode for lithium secondary batteries may dissolve in organic electrolytes after long-term storage without performing charge and discharge, thereby causing a failure of the positive electrode in lithium secondary batteries.

SUMMARY OF THE INVENTION

It is an object of the present invention to provide a high-performance spinel-type lithium-manganese oxide for use as a material for positive electrodes of a Li secondary battery with inhibited Mn dissolution in an organic electrolyte, as well as a high-performance lithium secondary battery using said lithium-manganese oxide as a positive electrode.

As a result of careful investigation, it has been found that the above object can be achieved by using a spinel-type lithium-manganese oxide containing at least one heteroelement (M) other than Li and Mn wherein Mn is replaced by Li and M, represented by the following formula:

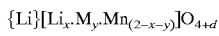

wherein { } represents the oxygen tetrahedral sites (8a sites) in the spinel structure and [ ] represents the oxygen octahedral sites (16d sites) in the spinel structure, $0<x\leq0.33$, $0<y\leq1.0$, $-0.5<d<0.8$, with said d value being negative when the calcination atmosphere is a reducing atmosphere, and being positive when it is an oxidizing atmosphere, and M represents at least one heteroelement other than Li and Mn.

Further, we found a process for preparing the spinel-type lithium-manganese oxide containing at least one heteroelement (M) other than Li and Mn according to the present invention as well as a high-performance lithium secondary battery using the spinel-type lithium-manganese oxide containing at least one heteroelement (M) other than Li and Mn according to the present invention as an active material for a positive electrode, and thus accomplished the present invention.

BRIEF DESCRIPTION OF THE DRAWINGS

The accompanying

The accompanying

DESCRIPTION OF PREFERRED EMBODIMENTS OF THE INVENTION

Figure 1:
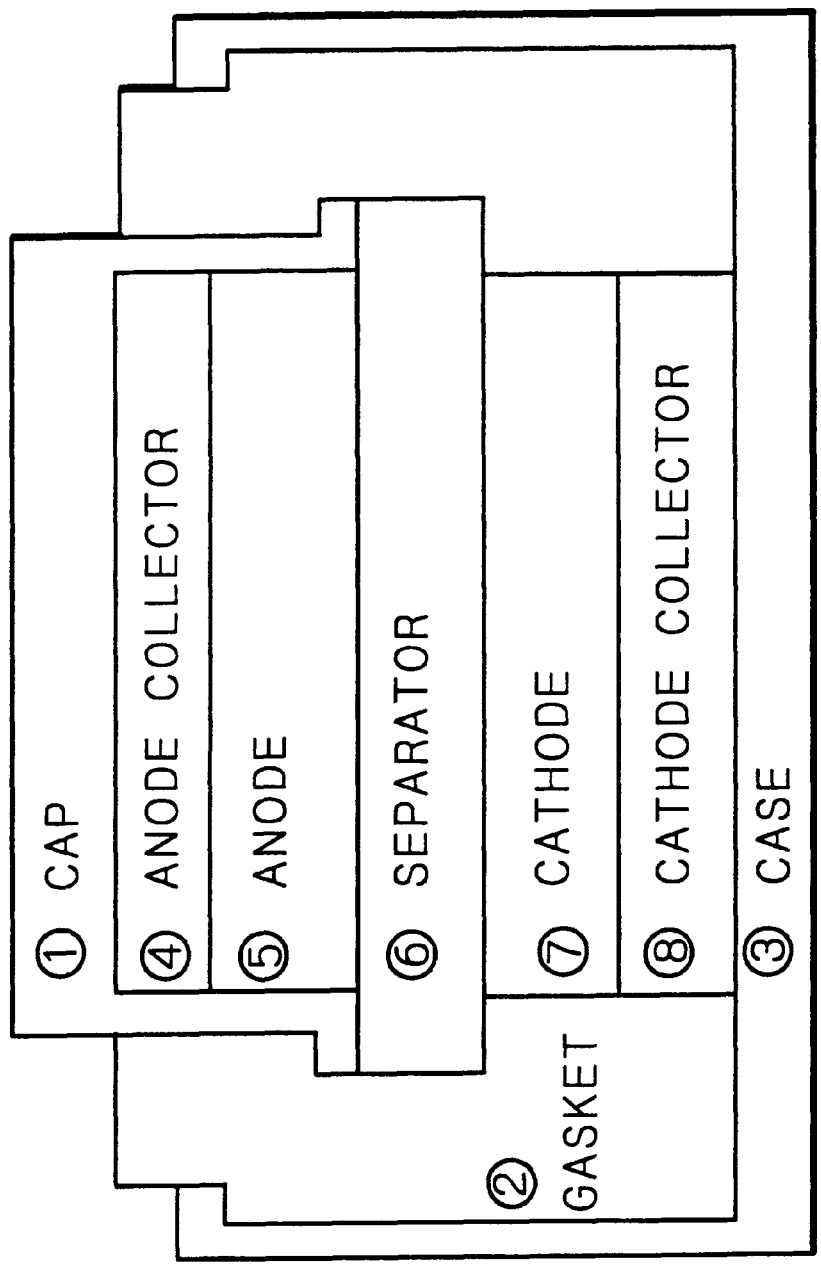
FIG. 1 shows a schematic, sectional view of a battery assembly in which a spinel-type lithium-manganese oxide according to the present invention is employed as an active material for a positive electrode.

The present invention will now be specifically explained.

The spinel-type lithium-manganese oxide containing at least one heteroelement (M) other than Li and Mn according to the present invention has the following formula:

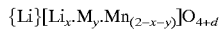

wherein { } represents the oxygen tetrahedral sites in the spinel structure and [ ] represents the oxygen octahedral sites in the spinel structure, $0<x\leq0.33$, $0<y\leq1.0$, $-0.5<d<0.8$, and M represents at least one heteroelement other than Li and Mn.

Preferably, said element M exists at the oxygen octahedral sites in the spinel structure to form a spinel-type lithium-manganese oxide with a cubic crystal spinel structure having a lattice constant (a) of not less than 8.19 angstroms and not more than 8.24 angstroms.

Non-cubic spinel structures such as tetragonal crystals are not preferable because working potential is lower with the result that the available energy is reduced when they are used to construct a Li secondary battery.

Lattice constants (a) outside said range are not preferable because manganese in the structure becomes unstable thereby causing increased Mn dissolution.

Said element M is at least one element selected from the group consisting of Be, Mg, Ca, Sr, Ba, Sc, Y, Ti. Zr, V, Nb, Ta, Cr, Mo, W, Fe, Co, Ni, Cu, Ag, Zn, B, Al, Ga, In, Si, Ge, Sn, Pb, P, As, Sb and Bi.

Preferably, the spinel-type lithium-manganese oxide containing at least one heteroelement according to the present invention has an average diameter of aggregated particles of 1–50 $\mu$m and a BET specific surface area of 0.1–5 $m^2$/g.

Average diameters of aggregated particles greater than said range or any BET specific surface area smaller than said range are not preferable because high temperatures are required for preparation thereof, and a comparable increase in performance is hardly obtained for use as an active material for batteries. Further, average diameters of aggregated particles smaller than said range or BET specific surfaces area greater than said range are also not preferable, because packing deteriorates in use as an active material for batteries and Mn dissolution from the structure along with other problems which readily occur.

Preferably, the spinel-type lithium-manganese oxide containing at least one heteroelement according to the present invention has a primary particle diameter of less than 3 μm. Values greater than said range are not preferable because no higher performance is hardly realized for use as an active material for batteries. In the spinel-type lithium-manganese oxide containing at least one heteroelement according to the present invention, the symbol (y) representing the content of the heteroelements is in the range of $0<y\leq1.0$. When two or more heteroelements are contained, the contents of various heteroelements are represented by y1, y2, y3, ... yn, and satisfy $0<y1+y2+y3+...+yn \leq 1.0$.

Total amounts of said (ys) of 1.0 or more are not preferable because charge/discharge capacity becomes lower.

In the spinel-type lithium-manganese oxide containing at least one heteroelement according to the present invention, Li exists at both of the oxygen tetrahedral sites and oxygen octahedral sites in the spinel structure so that the proportion (x) of the content existing at the oxygen octahedral sites to the content existing at the oxygen tetrahedral sites satisfies $0<x\leq0.33$.

Total amounts of Li of less than 1 are not preferable because a mono-phase spinel structure can not be obtained, or Mn dissolution into the organic electrolyte increases. Further, total amounts greater than said range are also not preferable, because charge/discharge capacity becomes lower.

The value of said (x) within a range of $0\leq x\leq0.15$ is especially preferable, because a high capacity can be achieved and Mn dissolution can be kept low.

When one heteroelement other than Li and Mn is contained in the oxide according to the present invention, the element is preferably Cr.

When the heteroelement is Cr, the formula of the compound according to the present invention is represented as follows:

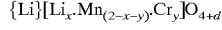

$\{Li\}[Li_x \cdot Mn_{(2-x-y)} \cdot Cr_y]O_{4+d}$ wherein { } represents the oxygen tetrahedral sites in the spinel structure and [ ] represents the oxygen octahedral sites in the spinel structure, with $0<x\leq0.33$, $0<y\leq1.0$, $-0.5<d<0.8$.

In this case, it is preferred that $0<x\leq0.15$ and $0.02\leq y\leq0.2$.

When two heteroelements (M(1), M(2)) other than Li and Mn are contained in the oxide according to the present invention, the formula of the compound according to the present invention is represented as follows:

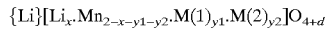

$\{Li\}[Li_x \cdot Mn_{2-x-y1-y2} \cdot M(1)_{y1} \cdot M(2)_{y2}]O_{4+d}$ wherein { } represents the oxygen tetrahedral sites in the spinel structure and [ ] represents the oxygen octahedral sites in the spinel structure, with $0<x\leq0.33$, $0<y1+y2\leq1.0$, $-0.5<d<0.8$, and M(1) and M(2) represent elements other than Li and Mn.

Preferably, one of the heteroelements M(1) contained is Cr and the other M(2) is a transition metal.

More preferably, one of the heteroelements M(1) contained is Cr and the other M(2) is Fe, as represented by the following formula:

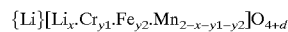

$\{Li\}[Li_x \cdot Cr_{y1} \cdot Fe_{y2} \cdot Mn_{2-x-y1-y2}]O_{4+d}$ wherein { } represents the oxygen tetrahedral sites in the spinel structure and [ ] represents the oxygen octahedral sites in the spinel structure, with $0<x\leq0.33$, $0<y1\leq0.5$, $0<y2\leq0.5$, $-0.5<d<0.8$.

In the above formula, it is preferred that $0<x\leq0.15$, $0<y1\leq0.2$ and $0<y2\leq0.2$.

The spinel-type lithium-manganese oxide containing at least one heteroelement according to the present invention contains Li at the oxygen tetrahedral sites as well as Li, Mn and at least one heteroelement (M) other than Li and Mn at the oxygen octahedral sites in its spinel structure, and it has a particle structure providing high performances when it is used as an active material for a battery.

The spinel-type lithium-manganese oxide containing at least one heteroelement according to the present invention can be prepared by mixing and calcining a manganese compound, a lithium compound and each compound of a heteroelement to be contained.

Compounds capable of producing an oxide at or below the calcination temperature selected from oxides, hydroxides, hydroxide oxides, carbonates, chlorides, nitrates, sulfates, etc. can be mixed, but oxides, hydroxides, hydroxide oxides and carbonates are especially preferable in respect of reactivity and environmental influences of waste gases.

It is essential to use a manganese oxide having an average diameter of aggregated particles of 0.5–50 μm as a starting manganese compound, and the starting manganese compound preferably has a molding density of not less than 2.7 g/cm³.

It is not preferable to use any manganese oxide outside said range, because a product satisfying particle characteristics of the spinel-type lithium-manganese oxide containing at least one heteroelement according to the present invention can hardly be obtained from such a manganese oxide.

It is also preferable to use a starting manganese compound having Na and K contents of not more than 500 ppm. It is difficult to prepare a high-performance Li secondary battery when a product with a starting compound having higher Na and K contents is used as an active material for the battery.

In the process for preparing a spinel-type lithium-manganese oxide containing at-least one heteroelement according to the present invention, it is preferable to use a lithium compound having a BET specific surface area of not less than 1 m²/g as the starting lithium compound.

Examples of the lithium compound include carbonates, nitrates, chlorides, hydroxides, oxides, etc., among which it is very preferable to use lithium carbonate having a BET specific surface area of not less than 1 m²/g because a homogeneous spinel-type lithium-manganese oxide containing at least one heteroelement can be readily prepared even in the air.

In the process for preparing the spinel-type lithium-manganese oxide containing at least one heteroelement according to the present invention, the calcination temperature is appropriately selected to obtain desired particle characteristics within a range of 500 to 1000° C.

Calcination temperatures outside said range are not preferable because the BET specific surface area and/or primary particle diameter of the resulting product does not fall within a desired range.

Calcination may be conducted either in air or an oxygen-rich atmosphere. However, it is preferably conducted in air for the sake of simplicity of the structure of the calcination furnace.

Under the preparation conditions described above, it is especially preferable to adopt the following procedures.

1. Mixing a manganese compound, a lithium compound and each compound of a heteroelement, thereafter granulating and then calcining the mixture.
2. Mixing a manganese compound and a lithium compound, granulating and calcining the mixture, thereafter formulating a lithium compound and/or each compound of a heteroelement to be contained, then granulating and then calcining the mixture.
3. Mixing a manganese compound, a lithium compound and each compound of a heteroelement to be contained, granulating and calcining the mixture, thereafter formulating any one of a manganese compound, a lithium compound and each compound of a heteroelement to be contained, then granulating and then calcining the mixture.

Any conventional means can be used so far as materials can be homogeneously mixed thereby. Calcination may also preferably be conducted with mixing in a rotary kiln or the like.

The resulting spinel-type lithium-manganese oxide is preferably ground and classified at an appropriate moment.

According to the present invention, a Li secondary battery was prepared using a spinel-type lithium-manganese oxide prepared as above as an active material for positive electrode.

Suitable active materials for negative electrode to be used in the lithium secondary battery according to the present invention include a metallic lithium and a material capable of occluding and releasing lithium or lithium ions. Specific examples thereof include metallic lithium, lithium/aluminium alloys, lithium/tin alloys, lithium/lead alloys and carbonaceous materials electrochemically intercalated/deintercalated with lithium ions. Among them, carbonaceous materials electrochemically intercalated/deintercalated with lithium ions are especially preferable in respect of safety and battery characteristics.

Suitable electrolytes to be used in the lithium secondary battery according to the present invention include, but are not specifically limited to, solution of a lithium salt dissolved in an organic solvent such as carbonates, sulfolanes, lactones, ethers; or a solid electrolyte conductive of lithium ion.

A battery shown in FIG. 1 was constructed using the spinel-type lithium-manganese oxide according to the present invention as an active material for positive electrode.

The battery in FIG. 1 includes cathode collector 8, cathode 7, separator 6, anode 5 anode collector 4 and cap 1 positioned sequentially on case 3 and centered by gasket 2 within case 3.

According to the present invention, a stable lithium secondary battery with high performances can be obtained by using the foregoing materials as an active material for positive electrode, an active material for negative electrode and a non-aqueous electrolyte containing a lithium salt.

The following examples illustrate the present invention, but are not construed to limit the same.

EXAMPLES

Various measurements in the following examples of the present invention and comparative examples were made under the following conditions.
X-ray diffraction (XRD) patterns were determined under the following conditions.
Instrument model: Material Analysis and Characterization Corp. Ltd., MXP-3
Irradiation X-rays: Cu Kα rays
Measurement mode: step scanning
Scanning condition: 0.04°/sec.
Measurement period: 3 seconds
Measurement range: 2θ ranging from 5°–80°.
Elemental analyses were performed by ICP spectrometry.
The oxidation degree of the elemental Mn was determined by an oxalate method.

SYNTHESIS OF SPINEL-TYPE LITHIUM-MANGANESE OXIDES

Examples and comparative examples of spinel-type lithium-manganese oxides were synthesized in the following manner.

Examples 1–5

Cr was used as the heteroelement M. The composition of the following formula:

$\{Li\}[Li_{0.06} \cdot Cr_y \cdot Mn_{(2-0.06-y)}]O_4$ was prepared by weighing $MnO_2$ having an average diameter of aggregated particles of 20 μm (electrolytic manganese dioxide made by TOSOH CORP.), lithium carbonate ($Li_2CO_3$) having a BET specific surface area of 3 m²/g and chromium oxide ($Cr_2O_3$) having an average diameter of aggregated particles of 1 μm with a varying ratio between Cr and Mn while the Li content expressed as (x) being fixed at 0.06 (Li:(Mn+Cr)=1.10:2.00) in the above formula, thoroughly mixing these components in a mortar, thereafter calcining the mixture provisionally at 450° C. for 24 hours, then at 750° C. for 24 hours.

Figure 2:
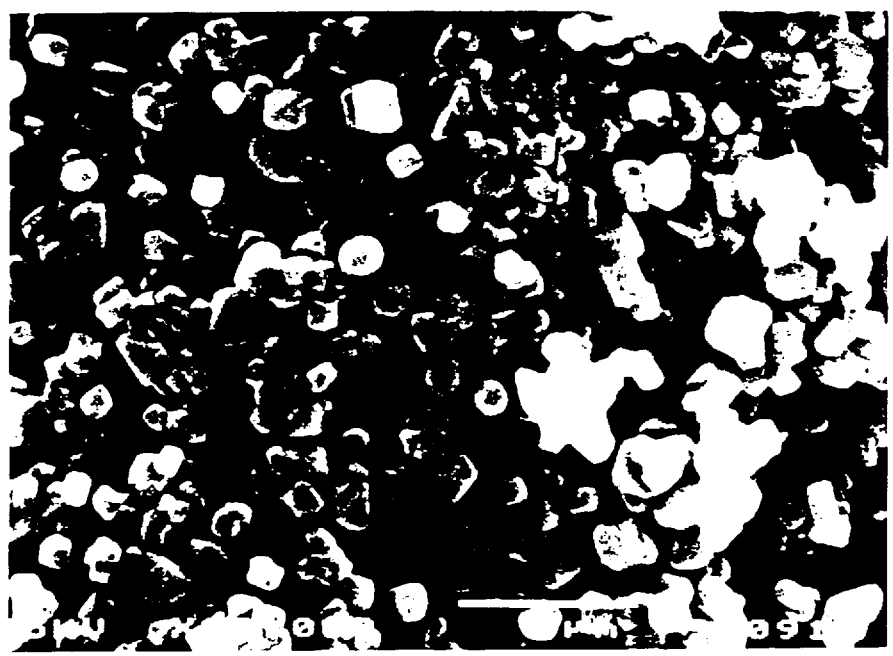
FIG. 2 shows a microphotograph showing the structure of the particles of the spinel-type lithium-manganese oxide obtained in Example 3, and the accompanying

The particle structure of the spinel-type lithium-manganese oxide obtained in Example 3 was observed by SEM. The SEM 20,000 magnification microphotograph thereof is shown in FIG. 2.

It was found from the figure that all particles of the spinel-type lithium-manganese oxide have a primary particle diameter of not more than 1 μm, and an average primary particle diameter of not more than 1 μm.

Further, it was estimated from the lattice constant value from X-ray diffraction and the Rietveld Analysis that the obtained spinel-type lithium-manganese oxides have the chemical formula as stated above.

Example 6

The procedure of Example 3 was repeated except that the final calcination temperature was increased from 750° C. to 900° C.

Figure 3:
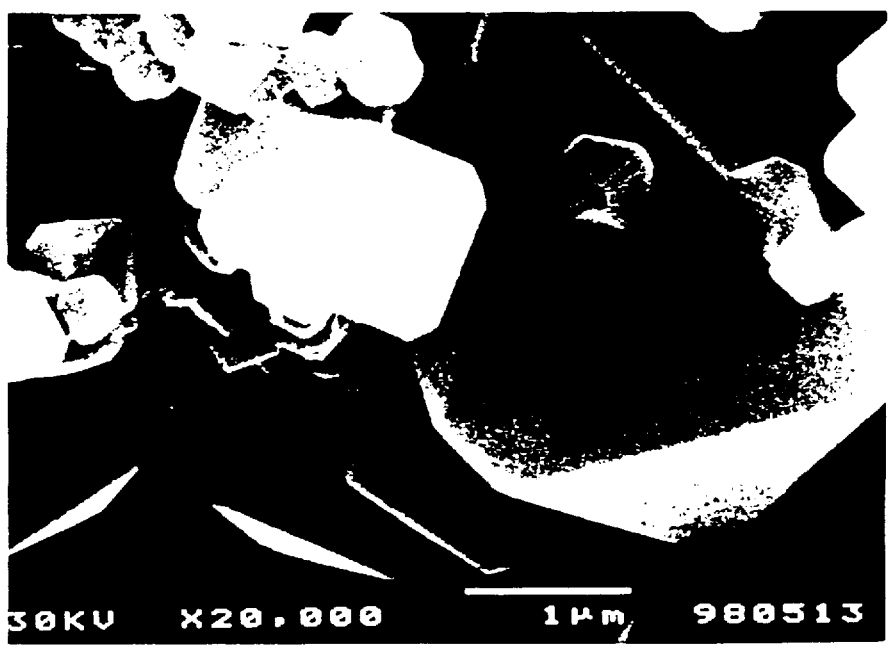
FIG. 3 shows a microphotograph showing the structure of the particles of the spinel-type lithium-manganese oxide obtained in Example 6.

The particle structure of the obtained spinel-type lithium-manganese oxide was observed by SEM. The SEM 20,000 magnification microphotograph thereof is shown in FIG. 3.

It was found from the figure that spinel-type lithium-manganese oxide includes some particles having a primary particle diameter of not less than 1 μm, but has an average primary particle diameter of not more than 3 μm.

Example 7

The procedure of Example 4 were repeated except that the Li content was chosen at a value of (x) of 0.02.

Examples 8–10

The procedure of Examples 2–4 was repeated except that Cr was replaced by Co. Basic cobalt carbonate was used as a starting Co material.

Examples 11–13

The procedure of Examples 2–4 was repeated except that Cr was replaced by Ni. Basic nickel carbonate was used as a starting Ni material.

Examples 14–16

The procedure of Examples 2–4 was repeated except that Cr was replaced by Fe. $Fe_3O_4$ was used as a starting Fe material.

Example 17

Using Cr as a first heteroelement M1 and Fe as a second heteroelement M2, the composition of the following formula:

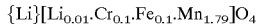

$\{Li\}[Li_{0.01}.Cr_{0.1}.Fe_{0.1}.Mn_{1.79}]O_4$ was prepared by weighing $MnO_2$ having an average diameter of aggregated particles of 20 μm, $Li_2CO_3$ having a BET specific surface area of 3 m²/g as well as $Cr_2O_3$ and $Fe_3O_4$ both having an average diameter of aggregated particles of 1 μm so that the Li content expressed as (x) is 0.01 (Li:(Li+Mn+Cr+Fe)=1.01:3.00) with (y1) being 0.1 and (y2) being 0.1 in the above formula, thoroughly mixing these components in a mortar, thereafter calcining the mixture provisionally at 450° C. for 24 hours, then at 750° C. for 24 hours.

Comparative Example 1

$MnO_2$ having an average diameter of aggregated particles of 20 μm (electrolytic manganese dioxide made by TOSOH CORP.) and lithium carbonate having a BET specific surface area of 3 m²/g were weighed so that x=0.0 (Li:Mn=1.00:2.0) and thoroughly mixed in a mortar, thereafter calcined provisionally at 450° C. for 24 hours, then at 750° C. for 24 hours.

The product showed a similar pattern to that of $LiMn_2O_4$ of a JCPDS card 35–782.

Comparative Example 2

The procedure of Comparative example 1 was repeated except that x=0.10 (Li:Mn=1.10:2.0).

Comparative Example 3

The procedure of Comparative example 1 was repeated except that x=0.15 (Li:Mn=1.15:2.0).

Comparative Example 4

The procedure of Comparative example 1 was repeated at Li:Cr:Mn=0.95:0.2:1.80 and calcined under the conditions of Comparative example 1.

The products of the examples and comparative examples showed a cubic spinel structure in single phase except for that of Comparative example 4.

Mn DISSOLUTION TEST

Each 3 g of the lithium-manganese oxides prepared in the examples and comparative examples was placed in 15 ml of an electrolyte of lithium hexafluoride phosphate dissolved in a mixed solvent of ethylene carbonate and dimethyl carbonate at a concentration of 1 mole/dm³, and maintained at 85° C. for 100 hours, after which the Mn content in the electrolyte was analyzed by ICP spectrometry.

The results are shown in Table 1.

CONSTRUCTION OF BATTERIES

Samples of the lithium-manganese oxides obtained in the examples and comparative examples before and after the above Mn dissolution test were used in a battery test. For the battery test, each sample was mixed with a conductive mixture of polytetrafluoroethylene and acetylene black (trade name: TAB-2) at a weight ratio of 2:1. The mixture was pelletized on a mesh (SUS 316) under the pressure of 1 ton/cm², and then dried in vacuo at 200° C. for 24 hours.

A battery as shown in FIG. 1 was constructed by using the thus obtained pellet as a positive electrode 3 in FIG. 1, a lithium piece cut out from a lithium foil (0.2 mm in thickness) as a negative electrode 5 in FIG. 1, a solution of lithium hexafluoride phosphate dissolved in a mixed solvent of propylene carbonate and diethyl carbonate at a concentration of 1 mole/dm³ as an electrolyte with which a separator 4 in FIG. 1 is impregnated, and a carbonaceous material electrochemically intercalated/deintercalated with lithium ions as an active material for negative electrode.

EVALUATION OF BATTERY CHARACTERISTICS

Batteries were prepared by using the lithium-manganese oxides prepared in the examples and comparative examples as an active material for positive electrode, and repeatedly cycled between charge and discharge at a constant current of 1.0 mA/cm² and a battery voltage from 4.5 V to 3.5 V.

The test was run at room temperature and at 50° C.

Table 1 shows initial capacities, capacity retention (% of discharge capacity at the 50th cycle to 10th cycle) and dissolution test retention (% of the capacity after dissolution test to initial capacity before dissolution test).

ADVANTAGES OF THE INVENTION

The spinel-type lithium-manganese oxide of the present invention shows less dissolution of Mn in an organic solvent, stable charge/discharge cycling characteristics even after long-term storage and less deterioration during charge/discharge at high temperatures.

|  | Li content | Hetero-element |  | Mn Dissolution | Lattice constant | BET | Initial capacity | Capacity retention (%) | | Dissolution test retention |
|---|---|---|---|---|---|---|---|---|---|---|
|  | (1 + x) | M | y | (mol %) | (A) | (m²/g) | (mAH/g) | RT | 50° C. | (%) |
| Ex.1 | 1.06 | Cr | 0.01 | 0.65 | 8.237 | 1.75 | 120 | — | — | — |
| Ex.2 | 1.06 | Cr | 0.02 | 0.49 | 8.235 | 1.58 | 120 | — | — | — |
| Ex.3 | 1.06 | Cr | 0.1 | 0.09 | 8.230 | 2.31 | 108 | 99 | 94 | 90 |
| Ex.4 | 1.06 | Cr | 0.2 | 0.11 | 8.223 | 1.83 | 94 | 99 | 95 | 95 |
| Ex.5 | 1.06 | Cr | 0.4 | 0.14 | 8.209 | 1.80 | 63 | 97 | 95 | 95 |
| Ex.6 | 1.06 | Cr | 0.1 | 0.07 | 8.237 | 0.90 | 103 | 99 | 94 | 90 |
| Ex.7 | 1.02 | Cr | 0.2 | 0.20 | 8.242 | 2.11 | 115 | 95 | 90 | 85 |
| Ex.8 | 1.06 | Co | 0.02 | 0.64 | 8.231 | 1.41 | 120 | — | — | — |
| Ex.9 | 1.06 | Co | 0.1 | 0.52 | 8.228 | 1.60 | 108 | 96 | 91 | 81 |
| Ex.10 | 1.06 | Co | 0.2 | 0.49 | 8.196 | 1.43 | 93 | 96 | 92 | 85 |
| Ex.11 | 1.06 | Ni | 0.02 | 0.62 | 8.234 | 1.56 | 117 | — | — | — |

-continued

|  | Li content (1 + x) | Hetero-element M | | Mn Dissolution (mol %) | Lattice constant (A) | BET (m²/g) | Initial capacity (mAH/g) | Capacity retention (%) | | Dissolution test retention (%) |
| --- | --- | --- | --- | --- | --- | --- | --- | --- | --- | --- |
|  |  |  | y |  |  |  |  | RT, | 50° C. |  |
| Ex.12 | 1.06 | Ni | 0.1 | 0.23 | 8.219 | 1.73 | 93 | 95 | 92 | 88 |
| Ex.13 | 1.06 | Ni | 0.2 | 0.13 | 8.202 | 1.66 | 63 | 96 | 92 | 90 |
| Ex.14 | 1.06 | Fe | 0.02 | 0.49 | 8.235 | 1.68 | 120 | 90 | 88 | 81 |
| Ex.15 | 1.06 | Fe | 0.1 | 0.31 | 8.237 | 2.11 | 108 | 92 | 90 | 85 |
| Ex.16 | 1.06 | Fe | 0.2 | 0.18 | 8.234 | 2.12 | 93 | 99 | 95 | 96 |
| Ex.17 | 1.01 | Cr | 0.1 | 0.05 | 8.239 | 1.88 | 107 | 99 | 95 | 94 |
|  |  | Fe | 0.1 |  |  |  |  |  |  |  |
| Com.1 | 1.00 | — | 0.0 | 1.06 | 8.242 | 1.80 | 130 | 90 | 60 | 60 |
| Comp.2 | 1.10 | — | 0.0 | 0.84 | 8.234 | 1.75 | 123 | 94 | 83 | 75 |
| Comp.3 | 1.15 | — | 0.0 | 0.83 | 8.219 | 1.62 | 106 | 95 | 84 | 76 |
| Comp.4 | 0.95 | Cr | 0.2 | 0.95 | — | 1.70 | — | — | — | — |

What is claimed is:

1. A spinel-type lithium-manganese oxide represented by the following formula:

$\{Li\}[Li_x \cdot Mn_{2-x-y1-y2} \cdot M1_{y1} \cdot M2_{y2}]O_{4+d}$, wherein

{ } represents oxygen tetrahedral sites in a spinel structure,

[ ] represents oxygen octahedral sites in the spinel structure, $0 < x \leq 0.33$, $0 < y1 + y2 \leq 1.0$, $-0.5 < d < 0.8$, M1 and M2 are each at least one transition metal other than Mn, and M1 and M2 are different.

2. The spinel-type lithium-manganese oxide according to claim 1, which has a cubic crystal structure having a lattice constant a of not less than 8.19 angstroms and not more than 8.24 angstroms.

3. The spinel-type lithium-manganese oxide according to claim 1, which has an average primary particle diameter of not more than 3 μm.

4. The spinel-type lithium-manganese oxide according to claim 1, which has an average diameter of aggregated particles of 1–50 μm and a BET specific surface area of 0.1–5 m²/g.

5. The spinel-type lithium-manganese oxide according to claim 1, wherein M1 is Cr.

6. The spinel-type lithium-manganese oxide according to claim 5, wherein $0 < x \leq 0.15$ and $0.02 \leq y1 + y2 \leq 0.2$.

7. A method of using a spinel-type lithium-manganese oxide, the method comprising using the spinel-type lithium-manganese oxide of claim 1 in an electrode of a Li secondary battery.

8. A Li secondary battery comprising a positive electrode, a negative electrode, a non-aqueous electrolyte that comprises a Li-containing electrolyte dissolved therein, and a separator, wherein the spinel-type lithium-manganese oxide of claim 1 is used as an active material for the positive electrode.

9. The Li secondary battery according to claim 8, wherein a carbonaceous material electrochemically intercalated/deintercalated with lithium ions is used as an active material for the negative electrode.

10. A process for preparing a spinel-type lithium-manganese oxide, the process comprising mixing and calcining a starting manganese compound, a starting lithium compound and at least two transition metals; and forming the spinel-type lithium-manganese oxide of claim 1, wherein a manganese oxide having an average diameter of aggregated particles of 0.5–50 μm is used as the starting manganese compound.

11. The process according to claim 10, wherein a density of the starting manganese compound is not less than 2.7 g/cm³.

12. The process according to claim 10, wherein Na and K contents in the starting manganese compound are each not more than 500 ppm.

13. The process according to claim 10, wherein BET specific surface area of the starting lithium compound is not less than 1 m²/g.

14. The process according to claim 13, wherein lithium carbonate is used as the starting lithium compound.

15. The process according to claim 10, wherein the calcining is conducted at a temperature of 500 to 1000° C. in air.

16. The process according to claim 10, further comprising granulating the starting manganese compound, the starting lithium compound and the at least two transition metals to form a mixture before calcining the mixture.

17. A spinel-type lithium-manganese oxide represented by the following formula:

$\{Li\}[Li_x \cdot Mn_{2-x-y1-y2} \cdot M1_{y1} \cdot M2_{y2}]O_{4+d}$, wherein

{ } represents oxygen tetrahedral sites in a spinel structure,

[ ] represents oxygen octahedral sites in the spinel structure, $0 < x \leq 0.33$, $0 < y1 + y2 \leq 1.0$, $-0.5 < d < 0.8$, M1 and M2 are each at least one transition metal other than Mn, and M1 and M2 are different, wherein M1 is at least Cr and M2 is Fe at least.

18. The spinel-type lithium-manganese oxide according to claim 17, wherein $0 < x \leq 0.15$, $0 < y1 \leq 0.2$ and $0 < y2 \leq 0.2$.

19. A method of using a spinel-type lithium-manganese oxide, the method comprising using the spinel-type lithium-manganese oxide of claim 17 in an electrode of a Li secondary battery.

* * * * *